United States Patent
Bogard (10) Patent No.: US 8,528,182 B2
(45) Date of Patent: Sep. 10, 2013

(54) ACHIEVING TENSION IN A SEATING UNIT BY PRE-FORMING A FRAME

(75) Inventor: Jeremy Bogard, Murray, KY (US)

(73) Assignee: L & P Property Management Company, South Gate, CA (US)

( * ) Notice: Subject to any disclaimer, the term of this patent is extended or adjusted under 35 U.S.C. 154(b) by 682 days.

(21) Appl. No.: 12/391,073

(22) Filed: Feb. 23, 2009

(65) Prior Publication Data

US 2010/0213750 A1 Aug. 26, 2010

(51) Int. Cl.
*B23P 11/02* (2006.01)

(52) U.S. Cl.
USPC .................................. 29/449; 29/448; 29/447

(58) Field of Classification Search
USPC ...................... 29/448, 449, 91.5; 297/440.11, 297/284.2, 452.56
See application file for complete search history.

(56) References Cited

U.S. PATENT DOCUMENTS

| | | | | |
|---|---|---|---|---|
| 4,299,645 | A | * | 11/1981 | Newsom ........................ 156/258 |
| 4,431,229 | A | * | 2/1984 | Unger ......................... 297/440.11 |
| 4,518,202 | A | * | 5/1985 | Bitsch .......................... 297/452.2 |
| 5,247,730 | A | * | 9/1993 | Serafini ............................ 29/449 |
| 5,457,864 | A | | 10/1995 | Sakaida |
| 5,527,500 | A | | 6/1996 | Specht |
| 5,681,197 | A | * | 10/1997 | Egami et al. .................... 445/30 |
| 6,050,646 | A | * | 4/2000 | Stenzel et al. ............ 297/452.59 |
| 6,125,521 | A | | 10/2000 | Stumpf |
| 6,280,276 | B1 | * | 8/2001 | Bucher et al. ................... 445/30 |
| 6,345,428 | B2 | * | 2/2002 | Apissomian ..................... 29/428 |
| 6,886,890 | B2 | * | 5/2005 | Rowland et al. .......... 297/452.56 |
| 7,111,373 | B2 | * | 9/2006 | Shimano et al. ............... 29/91.5 |
| 7,540,568 | B2 | * | 6/2009 | Behrens et al. ............. 297/445.1 |
| 2002/0125759 | A1 | | 9/2002 | Peterson |
| 2004/0250496 | A1 | | 12/2004 | Cvek |
| 2005/0161165 | A1 | | 7/2005 | Chen |

OTHER PUBLICATIONS

International Search Report and Written Opinion, PCT Application No. PCT/US2010/024771, mailed Apr. 23, 2010, 13 pages.

* cited by examiner

*Primary Examiner* — David Dunn
*Assistant Examiner* — Tania Abraham
(74) *Attorney, Agent, or Firm* — Shook Hardy & Bacon LLP (57) ABSTRACT

Various methods for installing an article of fabric to a frame to provide an improved seating product, which can be integrated in essentially any type of seating unit, are provided. These methods include a pre-forming operation that deforms the frame prior to securing the fabric article thereto, and a securing operation that leverages post-mold shrinkage properties of the frame to secure the fabric article thereto. The pre-forming operation generates tension in the fabric article, which spans the frame, by initially deforming the frame utilizing compression mechanisms of an assembly fixture and subsequently loading the fabric article to the frame in a loose condition. Upon releasing the compression mechanisms, the fabric article assumes a taut condition that expresses the tension. The securing operation involves inserting a segment of the fabric article into a groove in the frame and allowing the groove to naturally clamp the segment during post-mold shrinkage.

15 Claims, 6 Drawing Sheets

ACHIEVING TENSION IN A SEATING UNIT BY PRE-FORMING A FRAME

CROSS-REFERENCE TO RELATED APPLICATIONS

None.

STATEMENT REGARDING FEDERALLY SPONSORED RESEARCH OR DEVELOPMENT

None.

BACKGROUND OF THE INVENTION

Embodiments of the present invention relate broadly to seating units designed to support a user's body in an essentially seated disposition. Commonly, seating units include a backrest and/or a seat that are constructed with a hardness or firmness, which is established by stressing a fabric and fastening the stressed fabric to a frame. By way of example, a mesh-type fabric may be manually stretched and stapled to a frame to provide structure for a seat or a backrest of an automotive-style seating unit in order to support an occupant within a specific hardness or firmness. This hardness or firmness is fixed because it is based on permanent characteristics (e.g., flexure, thickness, material traits) of the fabric and the amount of stress that is applied to the fabric before attachment. Because manually stretching a fabric can impart only a limited amount of stress to fabric, the hardness or firmness of the assembled seat or backrest may not be high enough to provide proper support the occupant. Accordingly, the occupant of the seating unit (e.g., operators of the vehicle) with an individualized preference of hardness or firmness will likely experience discomfort when sitting in the seating unit for a period of time.

Consequently, integrating a frame pre-forming operation into an inline assembly of seats and/or backrests to allow for consistent, increased firmness of portion(s) of a seating unit would enhance the user's experience (e.g., level of comfort or support) when occupying the seating unit. Accordingly, embodiments of the present invention pertain to a novel method that involves deforming a frame prior to loading a fabric within the frame; thus, increasing the amount of tension (longitudinal and/or lateral) carried by the fabric upon being secured to the frame. The longitudinal and/or lateral tension may be adjusted by the amount of frame deformation to achieve a desirable level of firmness within the seating unit. This level of firmness may be based on an indication provided by a customer or other design specifications.

BRIEF SUMMARY OF THE INVENTION

Accordingly, the present invention seeks to provide an improved seating product, which can be integrated in essentially any type of seating unit. The seating product includes a consistent, heightened level of tension in at least one region of a seat or backrest of the seating unit. In an exemplary embodiment, the tension is achieved by implementing a novel pre-forming operation that deforms a frame prior to securing an article of fabric that spans the frame. In addition, the frame may be designed to naturally deform to generate additional tension within the secured fabric article by taking advantage of post-mold shrinkage that occurs in the frame when transitioning from a heated state (upon being released from an injection mold) to a stabilized state (upon partially curing in room temperature).

In a particular instance of this embodiment, a method for generating the tension in the article of fabric that spans the frame by pre-forming the frame prior to assembling the fabric article thereto is provided. Initially, the method includes providing the fabric article and providing the frame with elastic properties. The method may further include implementing the pre-forming operation to deform the frame. Generally, the pre-forming operation involves placing the frame into an assembly fixture that includes one or more compression mechanisms, and activating the compression mechanisms to apply a force to at least one portion of the frame. Upon deforming the frame, the fabric article may be loaded thereto in a loose condition, that is, without stress applied thereto. Once the fabric article is loaded onto the deformed frame, the compression mechanisms may be released; accordingly, applying tension to the fabric article such that the fabric article assumes a taut condition.

In another exemplary embodiment, a novel securing operation is implemented that leverages post-mold shrinkage properties of the frame to secure the fabric article thereto. The securing operation involves forming a groove in the frame that can receive a segment, or edge, of the fabric article when the frame resides in the stabilized state. As the frame rests after molding, or other forms of heating, the frame transitions from the stabilized state to a cured state. During this transition, the post-mold shrinkage properties of the frame cause the groove to shrink about the fabric article and clamp the fabric in place.

In a particular instance of this embodiment, a method for securing the article of fabric that spans the frame is provided. Initially, the method includes providing the fabric article and providing the frame with the groove formed therein that exhibits post-mold shrinkage properties. The method further includes implementing a securing operation to fixedly attach the article of fabric to the frame. Generally, the securing operation involves loading the segment of the fabric article into the groove formed within the frame while the frame resides in a stabilized state, and maintaining the segment of the fabric article in the groove while allowing the frame to transition from the stabilized state to a cured state. Typically, the groove is expanded to receive the segment of the fabric article when the frame resides in the stabilized state. Also, typically, the post-mold shrinkage properties of the frame cause the groove to contract about the segment of the fabric article during the transition, thereby fixedly attaching the fabric article to the frame.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims.

BRIEF DESCRIPTION OF THE SEVERAL VIEWS OF THE DRAWING

Illustrative embodiments of the present invention are described in detail below with reference to the attached drawing figures, which are incorporated by reference herein. In the accompanying drawings, which form a part of the specification and which are to be read in conjunction therewith, and in which like reference numerals are used to indicate like parts in the various views.

DETAILED DESCRIPTION OF THE INVENTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or varying components/materials similar to the ones described in this document, in conjunction with other present or future technologies.

Generally, embodiments of the present invention relate various novel processes for assembling an article of fabric to a frame. In one embodiment, the various novel processes include generating tension in the article of fabric by deforming the frame prior to installing the fabric article thereto. Deforming the frame may involve implementing a pre-forming operation that includes the following steps: transferring the frame from an injection mold to an assembly fixture (while in a heated state); allowing the frame to stabilize until it exhibits structural memory such that, upon being deformed, the frame elastically returns to a pre-deformed shape; and applying force to targeted portions of the frame (while in a stabilized state) using compression mechanism(s) of the assembly fixture. The fabric article may be installed to the deformed frame in a loose condition. When the applied force is released from the targeted portions of the frame, tension is generated on the fabric article and it assumes a taut condition. Further, additional tension may be generated in the fabric article by designing a shape of the frame to morph during the process of stabilization. Accordingly, because the fabric article can be installed to the frame in a loose condition, the fabric article can be pre-cut prior to installation, thereby saving material and a trimming operation. Also, because the fabric article can be installed to the frame in a loose condition, the labor-intensive and non-repeatable procedures of pre-stretching the fabric article prior to installation and attempting to fasten the pre-stretched fabric article to a frame while in tension are eliminated.

In another embodiment, the various novel processes include attaching the article of fabric to the frame by forming a groove in the frame that is designed to trap a segment of the fabric article. In particular instances, the frame is molded from a material with post-mold shrinkage properties that cause a strategically-placed groove in the frame to close when the frame cools from the stabilized state to a cured state. The fabric article is attached to the frame utilizing a securing operation that includes the steps of inserting the segment of the fabric material into the groove as expanded in the stabilized state, and retaining the inserted segment in the groove until the frame has achieved the cured state. At this point, the groove closes about the inserted segment. That is, the closed groove clamps the fabric article and resists releasing the inserted segment upon generating tension within the attached fabric article. Accordingly, cumbersome operations, such as stapling a material to a frame, are significantly reduced.

Figure 1:
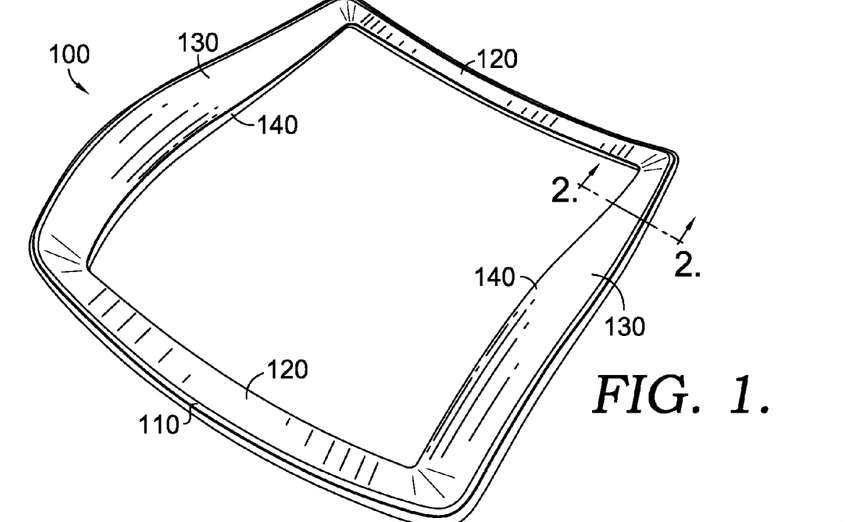
FIG. 1 is a diagrammatic perspective view of a frame with a groove formed therein, where the frame, as depicted, is designed according to distinct embodiments of the present invention.

Referring to the drawings in greater detail and initially to FIG. 1, a diagrammatic perspective view of a frame 100 with groove 110 formed therein is depicted. The frame 100, as illustrated, is designed according to distinct embodiments of the present invention. Initially, the frame 100 includes lateral members 120 and longitudinal members 130 that each include a wing section 140. As discussed more fully below, the wing sections 140 are provided to warp, or twist, the longitudinal members 130 outward while the frame 100 is curing, thereby generating tension on an article of fabric (not shown) secured to the groove 110. In embodiments, these lateral members 120 and the longitudinal members 130 are arranged in a substantial parallel-spaced relation, respectively. In other embodiments (not shown), the frame 100 may take a configuration of any 2-dimensional or 3-dimensional shape know to those of ordinary skill in the furniture-fabrication industry.

In embodiments, the design of the frame 100 may be generated as a joint effort between a manufacturer and a client. That is, aesthetic and functional aspects of the frame 100 may be devised by a client (e.g., retailer) according to customer specifications or anticipated market demand, while the manufacturer may manipulate the design in order to ensure the frame 100 experiences sufficient deformation during curing. Accordingly, when the client and manufacturer design the frame 100 in conjunction, aspects of aesthetics and function may be combined with deformation characteristics to create a design that satisfies both parties.

The frame 100, as illustrated, is configured as a single piece of material. In embodiments, this single-piece frame 100 may be created by an injection molding process that melts plastic pellets (e.g., nylon, polypropylene, ABS blend, or other non-brittle materials that withstand compression) within one or more cavities of an injection mold. Upon filling the cavities with the melted plastic pellets, the newly-created frame 100 resides at a temperature (e.g., 500 degrees Fahrenheit) that is substantially hotter than ambient temperature. This hot frame 100 may be withdrawn from the injection mold, or other type of press, to cool to the ambient temperature. At this point the frame 100 is flexible and malleable. Further, at this point, the frame 100 has not reached its final size or shape and resides in a heated state. As used herein, the phrase "heated state" is not meant to be limiting, but may encompass all stages of cooling of the frame 100 between being removed from a heat source (e.g., oven, injection mold, and the like), and reaching a stabilized state.

In embodiments, the phrase "stabilized state" is used herein to refer to a set of stages during the cooling of the frame 100 where the frame 100 begins to act less malleable and establishes a degree of rigidity. In one instance, when the frame 100 has transitioned from the heated state to the stabilized stated, the frame 100 attains structural memory that, upon the frame 100 being deformed, elastically returns the frame 100 to a pre-deformed shape. However, this is true mainly when the frame 100 is deformed within an elastic range of the material that composes the frame 100 (without entering into the material's plastic range). Accordingly, based on a shape and the material composition of the frame 100, a distance of deflection for deforming the frame 100 such that the frame 100 elastically returns to the pre-deformed shape may be measured or calculated. This distance of deflection can be used to gauge the pressure applied to the frame 100 during a pre-forming operation, as discussed more fully below. Generally, the pre-forming operation is implemented upon the frame 100 upon attaining the stabilized state.

In particular instances, the structural memory does not exist in the frame 100 upon being removed from injection mold, which inherently imparts a large amount of heat to the frame 100. Upon the dissipation of this heat over a predefined timeframe, structural memory becomes an attribute of the frame 100 as particles therein realign to form static characteristics. Occasionally, developing structural memory is referred to as establishing a "set point." When the set point is established, the frame 100 may be deformed (e.g., warped, twisted, bended, laterally collapsed, or longitudinally collapsed) such that the shape of the frame 100 elastically returns via the structural memory to shape similar to an originally molded shape and size, as discussed above.

As the frame 100 continues to cool to ambient temperature, the frame 100 transitions from the stabilized state to a final cured state. During this transition, the frame 100 undergoes noticeable morphing in shape and size from the original molded shape and size. Accordingly, any tension that is expressed by the fabric article attached to the frame 100 in the stabilized state may be affected upon the frame 100 transitioning to the cured state. In embodiments, the tension is affected by being increased to a higher level of tension in one or more directions and/or being decreased to a lower level of tension in other directions. A design of the frame 100 may dramatically influence the affect that the transition to the cured state has on the tension expressed by the fabric article. By way of example, the wing sections 140 of the longitudinal members 130 may pull inward when the frame 100 is transitioning to the cured state. This inward pulling flattens an initial angled orientation of the longitudinal members 130, thus, separating the grooves 110 formed on the longitudinal members 130 and creating additional tension on a fabric article mounted thereto.

As such, the design of the frame 100, as illustrated, may be configured to harness the morphing of the originally molded size and shape of the frame 100 (caused by the transition to the cured state) and to generate a specific amount of tension within targeted regions of the fabric article mounted to the frame 100. Accordingly, as used herein, the phrase "cured state" generally refers to stages in the cooling process where the frame 100 has reached a destination shape and size, or has reached ambient temperature. The destination size and shape are typically anticipated when designing the frame 100 so as to controllably introduce the specific tension to the targeted regions of the fabric article.

Although discussed as being molded from a plastic-based material, the frame 100 may be composed of any material which may be deformed or exhibits morphing when cooling. For instance, the material may be a soft metal or a fiberglass composite. Also, although one configuration of the frame 100 has been described, other types of suitable designs that increase/decrease morphing during cooling may be used, and embodiments of the present invention are not limited to the design of the frame 100 described herein. For instance, the frame 100 may include any number of the wing sections 140 that are located on other members of the frame 100. Further, the frame 100 may include two or more initial components that are assembled to construct the frame 100, as opposed to being molded as a single piece.

In application, the frame 100 may be integral to a seating unit (not shown). As such, embodiments of the present invention relate broadly to seating units designed to support a user's body. As utilized herein, the phrase "seating unit" is not meant to be limiting, but relates broadly to an apparatus designed to support a user's body in an essentially seated disposition. By way of example, a seating unit may generally refer to recliners, incliners, sofas, love seats, sectionals, office furniture, theater seating, traditional chairs, automotive seating, motion or stationary residential seating, chairs with a moveable seat portion, and any other seating systems know by those of ordinary skill in the field of furniture fabrication. Although several different configurations of the seating unit have been described, other seating unit designs with suitable arrangements of seats and backrests (acting independently or in conjunction with each other) may be used, and embodiments of the present invention are not limited to those configurations described herein.

Generally, an exemplary seating unit includes a backrest and/or seat disposed forward of a backrest. Additional examples of the seating unit may include a base structure that raises the backrest and/or seat above an underlying surface. When assembled to the seating unit, the frame 100 is integral to the backrest and/or seat. The fabric article that is loaded onto the frame 100, as more fully discussed below with reference to FIGS. 3-7, is secured to such that the fabric article expresses a level of tension. This level of tension translates to a firmness or hardness of the backrest and/or seat as perceived from an occupant of the seating unit. Accordingly, the manner of the assembly of the fabric article to the frame 100 governs the amount of comfort or support provided by a backrest and/or seat of a seating unit.

Returning to FIG. 1, the groove 110 will now be discussed. The groove 110 may be formed into the frame 100 when molding the frame 100. In other embodiments, the groove 110 is channeled into the frame 100 by any known manufacturing or fabrication process. As depicted, the groove 110 follows a perimeter of the frame 100. However, in other embodiments, the groove 110 may be discontinuous and may be formed on select members of the lateral members 120 and the longitudinal members 130. Or, the groove 110 may be formed on particular sections of the members 120 and 130 that are identified as sufficient to retain the fabric article when installed under tension.

Figure 2A:
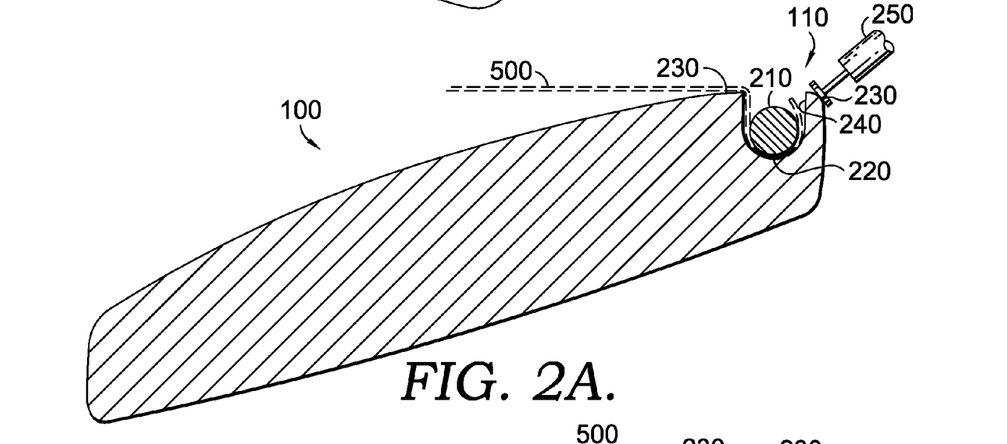
FIG. 2A is a cross-sectional view of an elongated cylindrical member inserted within the groove formed in the frame, in accordance with an embodiment of the present invention.
Figure 2B:
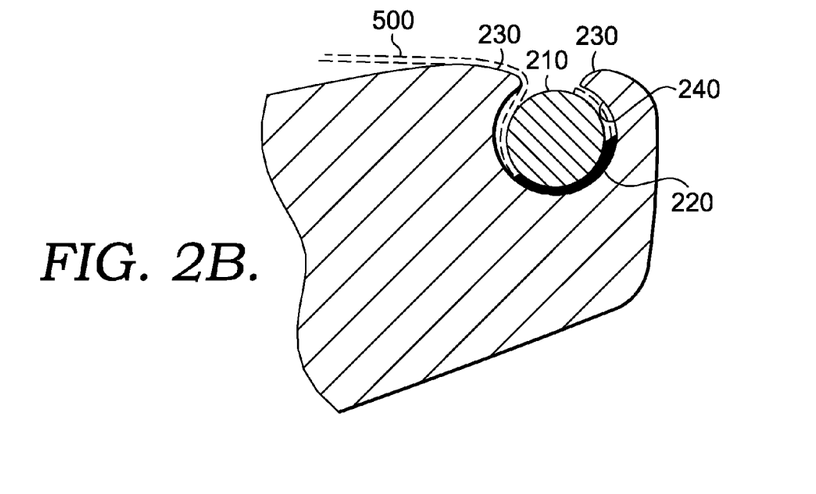
FIG. 2B is an enlarged portion of the cross-sectional view of FIG. 2, but illustrating the groove collapsed about the elongated cylindrical member as a result of the frame curing, in accordance with an embodiment of the present invention.

Further, dimensions of the groove 110 may vary from the configurations of the illustrated grooves 110 of the FIGS. 2A and 2B. In one embodiment, a width of the groove 110 depends on the type of material (thick or thin) that composes the fabric article 500. In another embodiment, the dimensions of the groove 100 are governed by a type of cosmetic appearance to be achieved upon the frame 100 reaching the cured state. By way of example only, exemplary dimensions of the groove may include a width of 0.135 inches and depth of 0.300 inches. In another example, the groove 110 is formed with a tear-drop profile that is configured to squeeze and compress contents inserted therein upon transitioning from the stabilized state to the cured state. Accordingly, by designing the dimensions of the groove 110 based on properties of the fabric article 500, and other relevant factors, the expanded groove 110 (see FIG. 2A) can easily receive the segment of the fabric article 500 while the contracted groove 110 (see FIG. 2B) can capture and hold the segment of the fabric article 500 without the need for secondary fasteners or extra assembly stations to apply the secondary fasteners.

A cross-sectional view of the groove 110 is shown in FIGS. 2A and 2B. In particular, FIG. 2A is a cross-sectional view of an elongated cylindrical member 210 inserted within the groove 110 formed in the frame 100, while FIG. 2B is an enlarged portion of the cross-sectional view of FIG. 2 that illustrates the groove 100 collapsed about the elongated cylindrical member 210 as a result of the frame 100 curing, in accordance with an embodiment of the present invention. Generally, the groove 110 includes walls 240 that, upon meeting the surface of the frame 100, form edges 230. When the frame 100 is in the stabilized state, the edges 230 are typically open, or spread apart from each other, allowing for loading of a segment of the fabric article 500. Additionally, the opened edges 230 allow for insertion of the elongated cylindrical member 210 to accompany the loaded segment of the fabric article 500. The elongated cylindrical member 210 may comprise collapsible tubing (e.g., soft-durometer rubber, plastic, and the like), cosmetic beads, compressible hollow stripping, or any other component known in the relevant field of art for retaining a fabric article 500.

In embodiments in which the elongated cylindrical member 210 is used to assist in securing the fabric article 500 to the frame 100, the elongated cylindrical member 210 and the fabric article 500 are installed to the groove 110 sequentially or in conjunction. Further, the elongated cylindrical member 210 and the fabric article 500 are installed when the frame 100 is in the stabilized state, as depicted in FIG. 2A. Generally, the edges 230 are opened and the groove 110 is expanded to receive a segment of the fabric article 500 in the stabilized state. The elongated cylindrical member 210 facilitates maintaining the segment of the fabric article 500 in the groove 110 while allowing the frame 100 to transition from the stabilized state to a cured state. As discussed above, the post-mold shrinkage properties of the frame 100 cause the groove 110 to contract about the segment of the fabric article 500 during this transition.

Figure 3:
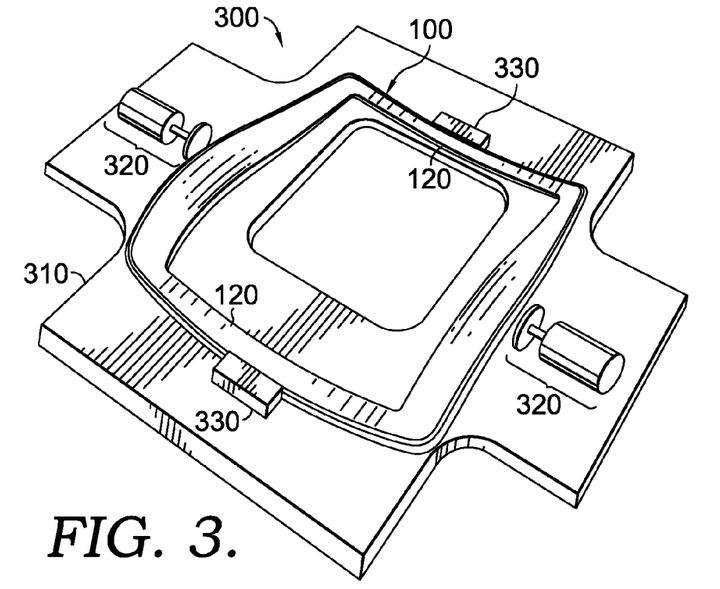
FIG. 3 is a diagrammatic perspective view of the frame placed within an assembly fixture, in accordance with an embodiment of the present invention.

In another embodiment, a pressure element 250 may be provided for assisting to collapse the groove 110 by applying pressure to one or more of the edges 230. The pressure element 250 may be configured as an extendable piston or cylinder (as depicted in FIG. 2A) that can automatically exert a linear force onto the frame 100 at one or more locations, thereby applying a pressure to the edge 230 at a predetermined setting for a predefined timeframe. Based on the design of the frame 100 and the groove 110 therein, this application of pressure may be sustained for the duration of the curing process, invoked intermittently throughout the curing process, provided at a fixed and continual time period within the curing process, or omitted from the curing process entirely. Although configured as a cylinder or piston in the embodiments described above, the pressure element 250 may be configured as any member of a fixture (e.g., assembly fixture 300 as depicted at FIG. 3) that assists in collapsing the groove 110 about the fabric article 500. For instance, the pressure element may be an adjustable plate that statically pushes against the frame 100 at one or more locations.

Turning to FIG. 2B, the frame 100 is depicted in the cured state, where the groove 110 is contracted about the segment of the fabric article 500. In this configuration, the edges 230 are collapsed, or closed, about the elongated cylindrical member 210 and the fabric article 500 that are installed to the groove 110. The collapsed edges 230 and the walls 240 of the groove 110 serve to clamp the segment of the fabric article 500 therebetween, thus, fixedly attaching the fabric article 500 to the frame 100. This clamp is sufficient to withstand a persistent tension expressed by the fabric article 500 in aggregation with loads (e.g., weight of an occupant on a seat of a seating unit) placed on the fabric article 500.

There are various procedures for maintaining the segment of fabric 500 in the groove 110 while waiting for the frame 100 to transition from the stabilized state to a cured state. In one exemplary procedure, the elongated cylindrical member 210 is inserted into the groove to accompany the loaded segment of the fabric article 500, as discussed above. In this procedure, contact or friction between the walls 240 of the groove 110 and the elongated cylindrical member 210 holds the segment of the fabric article 500 in place.

In another exemplary procedure, an adhesive 220 is applied into a portion of the groove 110 to accompany the loaded segment of the fabric article 500. Thus, the adhesive 220 holds the segment of the fabric article 500 in place until the groove 110 clamps thereabout. In yet other procedures, the adhesive 220 may be applied to the groove 110 while the segment of the fabric article 500 may be tacked into the groove 110 (e.g., utilizing one or more pieces of the elongated cylindrical member 210). In these procedures, the tacking maintains the segment of the fabric article 500 in the groove 110 until it clamps thereabout, while the clamp maintains the segment of the fabric article 500 in the groove 110 until the adhesive 220 cures. Accordingly, the adhesive 220 acts as a primary instrument for fixedly attaching the fabric article 500 to the frame 100. As used herein, the term "adhesive" is not meant to be limiting but may encompass all liquids and solids that may be employed to engage one element to another. For instance, the adhesives utilized for engaging the segment of the fabric article 500 to the groove 110 may include glue.

In embodiments, the process of tacking the fabric article 500 into the groove may involve a variety of steps. In one instance, an initial step may involve manually tacking the segment of the fabric article 500 into a portion of the groove 110. This portion of the groove 110 may comprise a section of the perimeter of the frame 100 that the groove 110 follows. In another instance, a subsequent step may involve utilizing a robotic device to automatically load a balance of an edge of the fabric article 500 into a balance of the perimeter of the groove 110. This balance of the edge of the fabric article 500 may be loaded using the elongated cylindrical member 210, as discussed above. A depiction of this exemplary process of tacking is found in FIG. 5, where the tacked fabric article 500 is being fully loaded onto the frame 100 by automatically and circumferentially inserting the elongated cylindrical member 210 into the groove 110.

Turning now to FIGS. 3-7, embodiments of the pre-forming operation will now be described. Generally, the pre-forming operation is employed to generate tension in the article of fabric 500 that spans the frame 100 by pre-forming the frame 100 prior to assembling the fabric article 500 thereto. Initially, an assembly fixture 300 may be provided to facilitate preforming the frame 100, as depicted at FIG. 3. In particular, FIG. 3 is a diagrammatic perspective view of the frame 100 placed within the assembly fixture 300, in accordance with an embodiment of the present invention. In one embodiment, the frame 100 may be placed in assembly fixture 300 immediately upon being released from the injection mold. That is, placing the frame 100 within the assembly fixture 300 may include removing the frame 100 from an injection mold while in a heated state, and transferring the frame 100 from the injection mold directly to the assembly fixture 300. In one instance, a robotic device (not shown) is utilized to implement the process of transferring the frame 100 to the assembly fixture 300.

In another embodiment, the frame 100 may be placed in the assembly fixture 300 after being partially or fully cooled. That is, the frame 100 may be set aside upon being released from the injection mold for particular time period. Further, this partially or fully cooled frame 100 may be reheated and then placed into the assembly fixture 300, thereby re-incorporating the properties that enable deformation to the frame 100. By way of example, a frame 100 purchased from a supplier may be remotely shipped to a manufacturing facility that accommodates the assembly fixture 300. In this example, the purchased frame 100 may be placed directly into the assembly fixture 300 upon delivery, or may be heated to a particular temperature before being mounted to the assembly fixture.

The assembly fixture 300 is configured to retain and deform the frame 100. In an exemplary embodiment, the assembly fixture 300 includes a foundation 310 that is coupled to one or more compressive mechanisms 320 that apply a force to at least one portion of the frame 100 and one or more capture elements 330 that fixedly retain at least one portion of the frame 100 during the execution of the preforming operation. In addition, the capture elements 330 may be used to secure the frame 100 to the assembly fixture 300 while the frame 100 is cooling from the heated state to the stabilized state. As illustrated, the capture elements 330 are assembled to the foundation 310 opposed to one another and act to secure the lateral members 120 of the frame 100 to the assembly fixture 300.

The foundation 310 is configured to interconnect the compressive mechanisms 320 and the capture elements 330. In embodiments, the foundation 310 may comprise a base plate that is fabricated or formed from metal stock, such as stamped, formed steel or aluminum. However, it should be understood and appreciated that any suitable rigid or sturdy material known in the furniture-manufacturing industry (e.g., fiberglass, plastics, composites, and the like) may be used as well. For instance, the foundation 310 may be manufactured from steel tubing or bar stock that is combined or formed to attain an appropriate shape (e.g., rectangle). Further, even though the illustrated design of the foundation 310 depicts the foundation 310 as being formed from a single piece of material fixedly attached (e.g., welded) to the compressive mechanisms 320 and the capture elements 330, it should be understood that individual members or various combinations of members may be assembled to compose the foundation 310. In addition, although a generally rectangular shape of the foundation 310 is described and illustrated in FIGS. 3-6, any shape, profile, or structural design is contemplated by the embodiments of the present invention.

Generally, the compression mechanisms 320 are configured to elastically deform, warp, twist, and/or compress the frame 100 (horizontally and/or vertically) while the frame 100 is in the stabilized state—still heated from the injection mold but with structural memory properties established. In embodiments, elastically deforming may involve pneumatically, hydraulically, electrically, or manually invoking the compression mechanisms 320 to deform the frame 100. Accordingly, the compression mechanisms 320 may include, but are not limited to, any of the following devices: manual lever-type clamp, hydraulic cylinder, pneumatic piston, or electrical motor (e.g., stepper motor, screw-drive motor, and the like). As discussed above, the compression mechanisms 320 may be actuated manually or automatically (e.g., automated). In embodiments where the compression mechanisms 320 are automated, the frame 100 is consistently deformed a particular amount, thereby attaining repeatable resultant tension in the fabric article 500.

In embodiments where the compression mechanisms 320 are automated, the compression mechanisms 320 may be automatically actuated upon the occurrence and detection of an event. In one embodiment, the event may be the expiration of a predefined period of time, where the predefined period of time may be based on a time for transitioning from the heated state to the stabilized stated. In another embodiment, the event may be reaching a particular location or station on the assembly line. Although two different configurations of the events have been described, other types of suitable triggers for automatically actuating the compression mechanisms 320 may be used, and embodiments of the present invention are not limited to those events described herein.

Further, the compression mechanisms 320 and the capture elements 330 may be coupled to the foundation 310 by any known method for joining two elements known by those of ordinary skill in the art. For instance, the coupling may be accomplished utilizing fasteners 235, which may be by hex-bolts and hex-nuts. In other instances, this interconnection between the compression mechanisms 320, the capture elements 330, and the foundation 310 can take a variety of configurations, such as pivot pins, bearings, traditional mounting hardware, rivets, bolt and nut combinations, or any other suitable fasteners which are well known in the furniture-manufacturing industry. Further, the shapes and orientations of the compression mechanisms 320 and the capture elements 330 may vary, as may the locations of certain connection or pivot points between the compression mechanisms 320, the capture elements 330, and the foundation 310. Further, it will be understood and appreciated that when components of the assembly fixture 300 are referred to as being "coupled" to, "interconnected" with, fixedly "attached" to, etc., another element, it is contemplated that the components and element may be in direct contact with each other, or other elements (such as intervening elements) may also be present.

Figure 4:
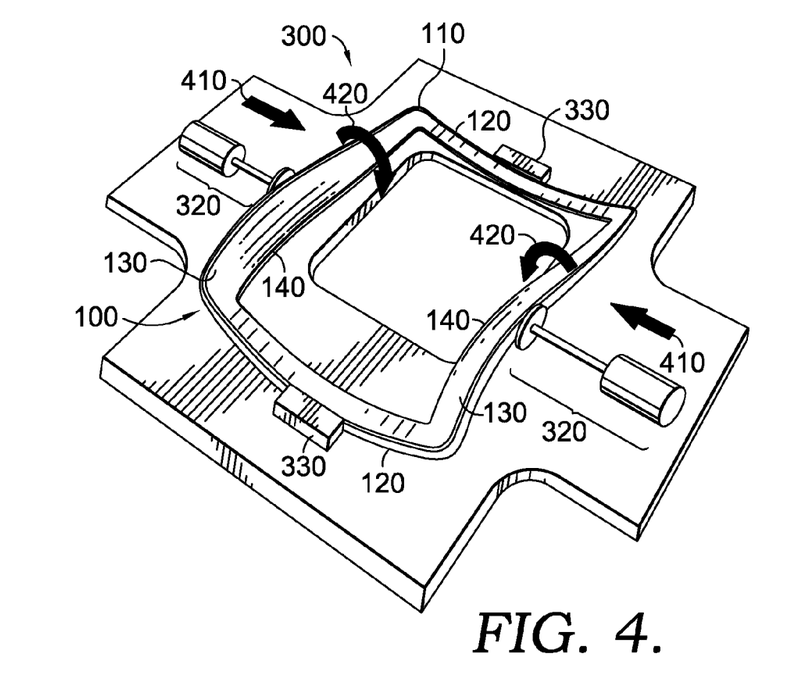
FIG. 4 is a view similar to FIG. 3, but illustrating compression mechanisms of the assembly fixture applying a directional force to deform the frame, in accordance with an embodiment of the present invention.

In an exemplary embodiment, with reference to FIG. 4, the locations of the compression mechanisms 320 may be adjusted based upon which regions of the fabric article 500 are targeted to express a higher level of tension (see reference numeral 600 of FIG. 6) than another region of the fabric article 500. Accordingly, the compression mechanisms 320 may be positioned on the foundation 310 to engage portions of the frame 100 that are proximate to the targeted regions of the fabric article 500. By way of example, if the frame 100 will eventually be integrated with a seat of a seating unit, and if the region of the fabric article 500 that is targeted to express a higher level of tension is a lumbar region (see reference numeral 600 of FIG. 6), the compression mechanisms 320 are positioned on the foundation 310 to engage a substantially mid-portion of the longitudinal members 130. As such, the lumbar region is interdisposed between the points the compression mechanisms 320 engage on the frame 100.

In this example, when the compression mechanisms 320 are actuated, they extend into the appropriate portions of the frame 100 and apply a directional force 410 thereto. The force 410 causes the frame 100 to deform. In embodiments, if the longitudinal members 130 include wing sections 140 that extend in an angular orientation, the applied directional force 410 may generate a torque 420 with a moment about the wing sections 140. This torque 420 draws the groove 110 formed on the longitudinal members 130 closer together. In particular, the groove 110 located at the mid-portion of the longitudinal members 130 travels the farthest distance inward, thus, the mid-portion of the longitudinal members 130 is deformed by the greatest amount. Upon loading of the fabric article 500 and releasing the frame 100 from the assembly fixture 300, the portions of the frame 100 that received the greatest amount of deformation generate the highest level of tension therebetween.

The amount of the directional force 410 applied is based, in part, on the elastic range of the material composing the frame 100 when in the stabilized state. In an exemplary embodiment, the directional force 410 is metered to create 3% to 10% deflection in one or more of the frame members 120 or 130 in the lateral or longitudinal directions. This percentage range of deflection allows for sufficient deformation to generate tension in the fabric article 500 while avoiding permanently, or plastically, bending the frame 100. In addition, the directional force 410 applied may be modified to compensate for the natural shrinkage of the frame 100 when transitioning from the stabilized state to the cured state, as discussed more fully above. For instance, based on the design of the frame 100, the shrinkage of the frame 100 during cooling may enhance the tension created by the pre-forming operation. In other instances, the shrinkage relaxes the created tension. By way of example, a 10% deflection of the frame 100 that is relaxed by the shrinkage may result in a 7% stretch of the fabric article 500. Accordingly, an increased deflection may be appropriate for yielding a 10% stretch of the fabric article 500.

In embodiments, the compression mechanisms 320 may be metered to manipulate the amount of the directional force 410 applied to the frame 100. Metering the directional force 410 controls the deformation of the frame 100, which impacts the resultant tension of the fabric article 500. Accordingly, the pre-forming operation may involve receiving instructions (e.g., customer order, design constraints, and the like) that convey a particular tension to be incorporated into the fabric article 500, and metering the directional force 410 to deform the frame 100 such that the particular tension is generated in the fabric article 500 that satisfies the instructions.

Figure 5:
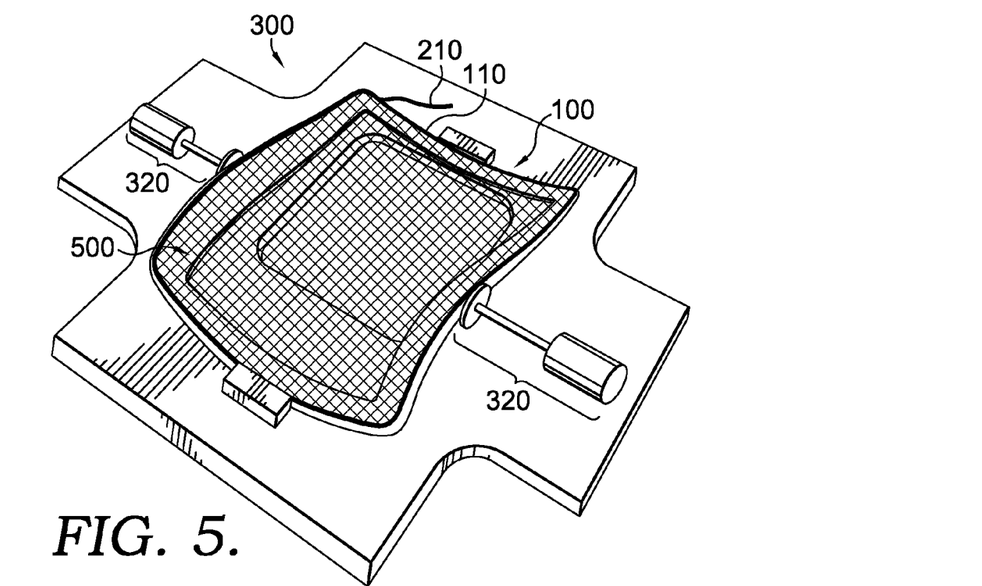
FIG. 5 is a view similar to FIG. 4, but illustrating an article of fabric being secured to the deformed frame, in accordance with an embodiment of the present invention.
Figure 6:
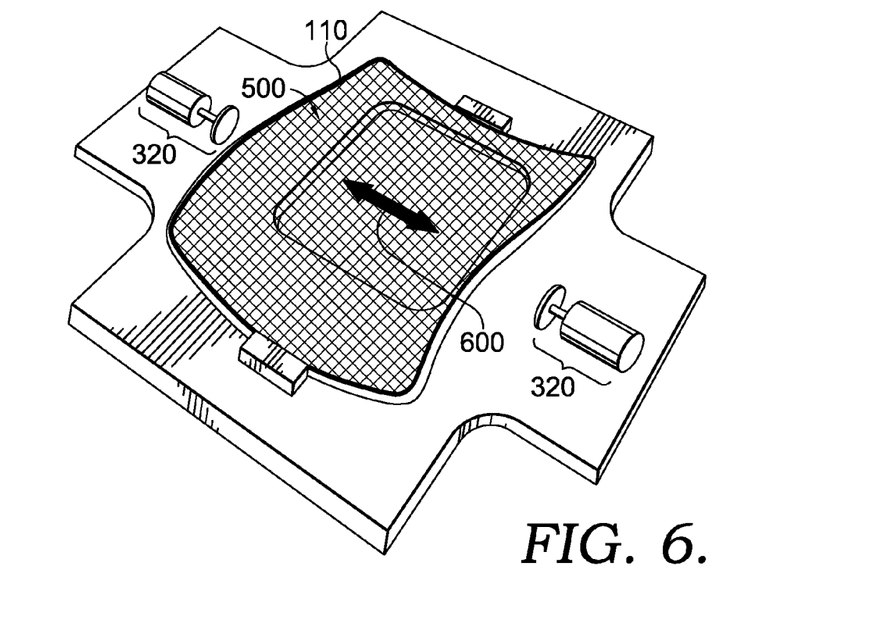
FIG. 6 is a view similar to FIG. 5, but illustrating the compression mechanisms of the assembly fixture releasing the directional force applied to the frame and illustrating the frame generating tension within the fabric article secured thereto, in accordance with an embodiment of the present invention.

The pre-forming operation may further include loading the fabric article 500 to the frame 100 when deformed (see FIG. 5), and releasing the frame 100 from the directional force 410 of the compression mechanisms 320 (see FIG. 6). In particular, FIG. 5 is a view similar to FIG. 4, but illustrating the article of fabric 500 being secured to the deformed frame 100, in accordance with an embodiment of the present invention. Generally, the fabric article 500 is loaded to the frame 100 consistent with the securing operation discussed above.

In embodiments, the fabric article 500 may comprise a mesh fabric, a weave fabric, a knit fabric, a bonded fabric, a non-bonded fabric, or any other material known to have minimal to substantial intrinsic elastic characteristics. In an exemplary embodiment, the fabric article 500 is comprised of a leno weave fabric that has a 55 durometer co-polyester elastomeric (such as Hytrel -Dupont) monofilaments in the warp and a polyester yarn in the weft. The elastomeric monofilaments while tensioned provide resilience and memory properties to the fabric. In embodiments, the selection of the type of fabric article to be used is dependent on the design of the frame 100 and the amount of deformation the frame 100 experiences. For instance, if the frame 100 is designed to be deformed such that frame 100 is compressed to 7% of its original width or length, then one matching type of fabric article 500 that may be selected in this instance is composed of an extendable elastomeric material. Accordingly, the design of the frame 100, the design of the assemble process, and the selection of the type of fabric article 500 may be based on one another, and designed/selected with consideration of each other, in order to optimize the overall design.

In addition, the fabric article 500 may be pre-cut from fabric stock prior to installation to the frame 100. That is, because a profile of the perimeter of the frame 100 may be easily captured when deformed by the directional force 410 applied thereto, a pattern that corresponds with the profile may be cut from fabric stock to form the fabric article 500. In one instance, cutting the pattern from fabric stock to form the fabric article 500 includes utilizing a laser-cutting device to automatically trim the fabric article 500 from the fabric stock. This step of pre-cutting to an exact shape that reduces trim waste is not available in conventional assembly procedures that require excess material on a fabric article to hold onto when stretching the fabric article to generate tension prior to attachment to a frame 100. Accordingly, the step of pre-cutting saves material and a trimming procedure over the conventional assembly procedures because the pattern of the fabric article 500 will accurately align with the profile of the perimeter of the frame 100, or of the groove 110.

Releasing the frame 100 from the directional force 410 of the compression mechanisms 320 will now be described with reference to FIG. 6. In particular, FIG. 6 is a view similar to FIG. 5, but illustrating the compression mechanisms 320 of the assembly fixture 310 releasing the directional force 410 applied to the frame 100, in accordance with an embodiment of the present invention. In one configuration, the compression mechanisms 320 are retracted (manually or automatically) to allow the frame 100 to revert to a non-deformed configuration. In this configuration, the tension 600 is generated within the fabric article 500 secured to the frame 100. Accordingly, the fabric article 500, which was installed to the frame 100 in a loose condition, assumes a taut condition that expresses the tension 600. The tension 600 may have a particular level that relates to a degree of firmness exhibited by the seat or backrest in which the frame 100 is integrated.

Figure 7:
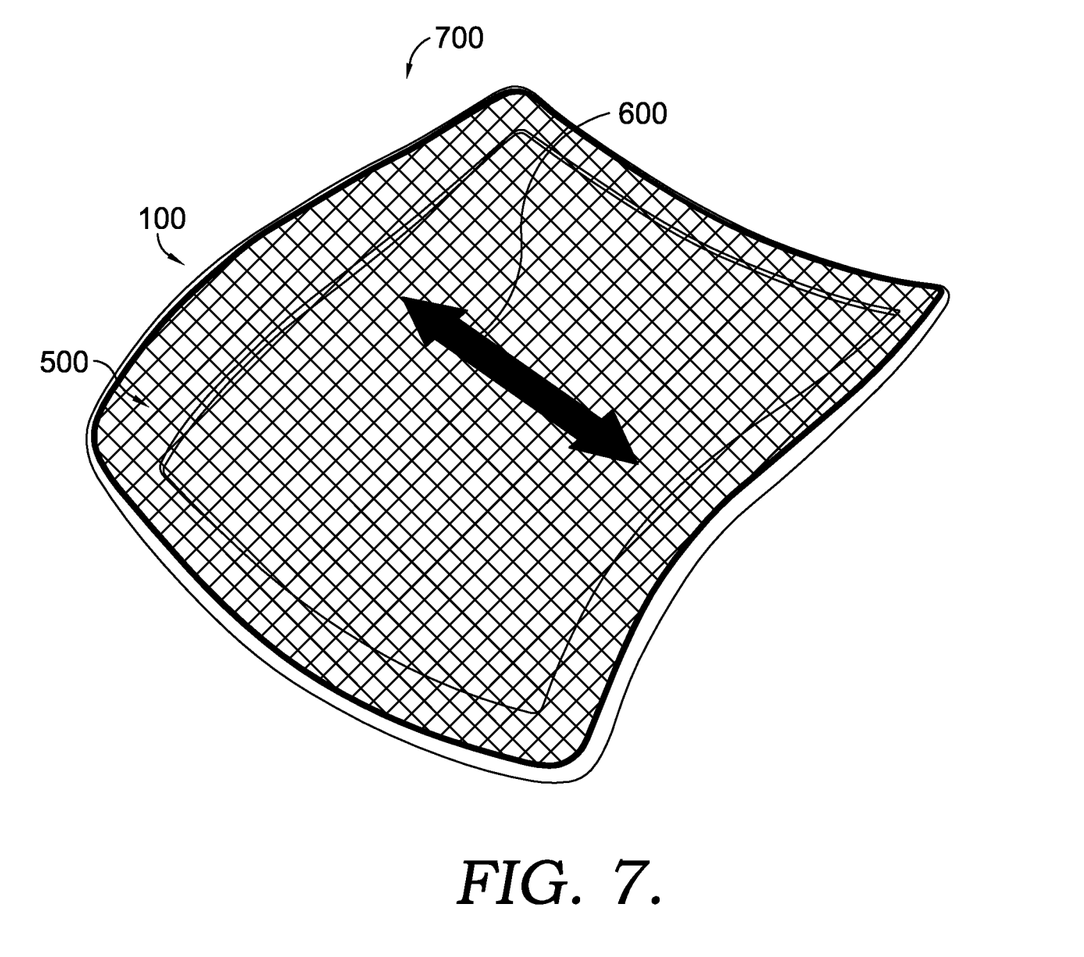
FIG. 7 is a view similar to FIG. 6, but illustrating the fabric article secured to the frame that maintains the fabric article in tension, in accordance with an embodiment of the present invention.

Turning now to FIG. 7, a view similar to FIG. 6 is shown, but illustrating the fabric article 500 secured to the frame 100 as assembly 700. Upon removal of the assembly 700 from the assembly fixture (see reference numeral 300 of FIGS. 3-6), the assembly 700 maintains the fabric article 500 in tension 600, in accordance with an embodiment of the present invention. Although depicted as a laterally oriented stress, the tension 600 may be oriented in any direction (e.g., vertically orientated stress) substantially parallel the fabric article 500 as controlled by the arrangement of the assembly fixture (see reference numeral 300 of FIGS. 3-6) and the implementation of the pre-forming operation. Or, the tension 600 may be multidirectional.

Figure 8:
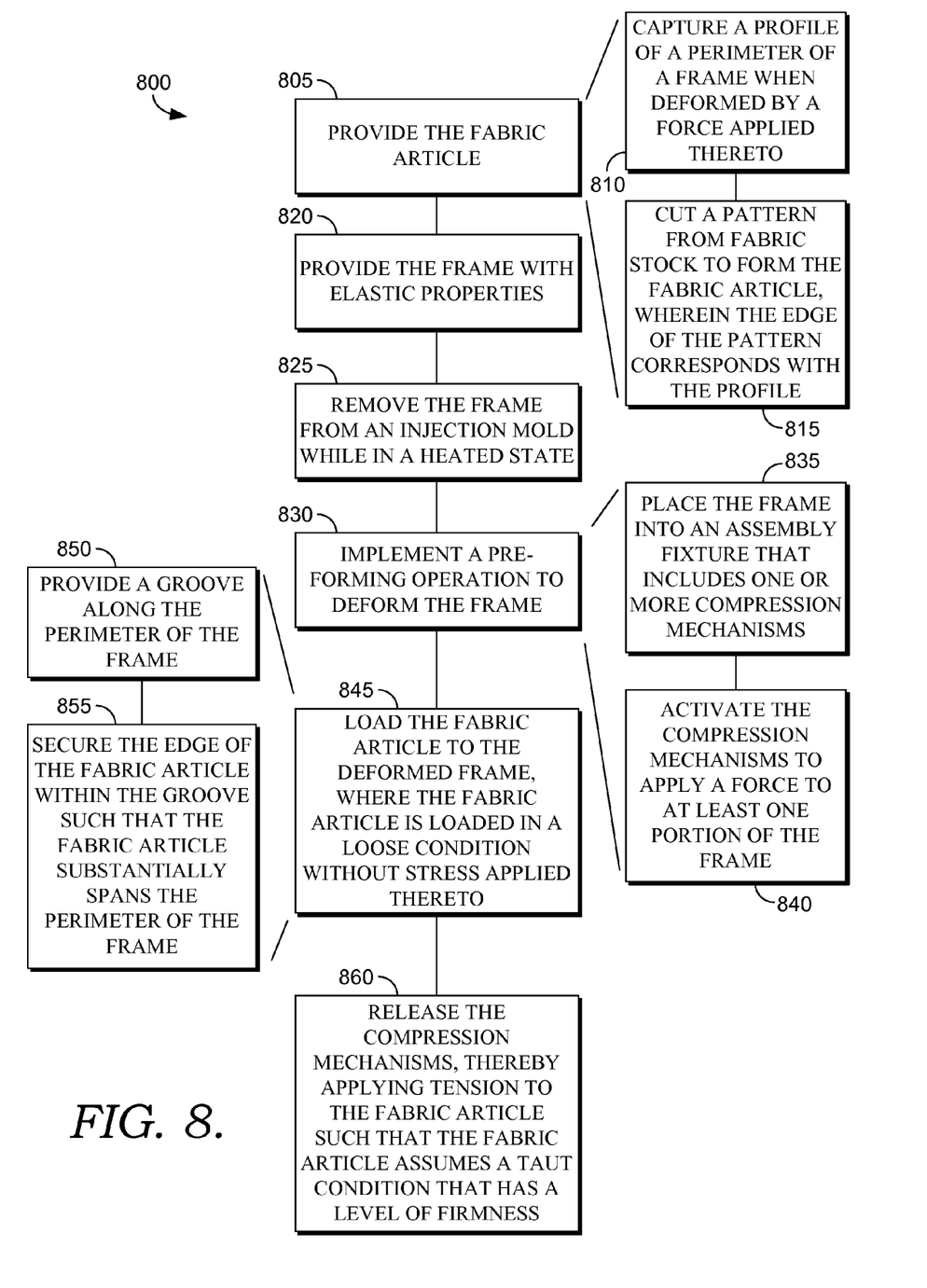
FIG. 8 illustrates an overall flow diagram of a method for generating tension in the article of fabric that spans the frame by pre-forming the frame prior to assembling the fabric article thereto, in accordance with an embodiment of the present invention.

Turning now to FIG. 8, steps of a method 800 to implement an exemplary pre-forming operation will now be described. Generally FIG. 8 shows an overall flow diagram illustrating the method 800 for generating tension in the article of fabric that spans the frame by pre-forming the frame prior to assembling the fabric article thereto, in accordance with an embodiment of the present invention. Although the terms "step" and "block" are used hereinbelow to connote different elements of methods employed, the terms should not be interpreted as implying any particular order among or between various steps herein disclosed unless and except when the order of individual steps is explicitly described.

Initially, the fabric article is provided, as depicted at block 805. Providing the fabric article may involve at least the step of capturing a profile of a perimeter of the frame when deformed by one or more directional forces applied thereto, as depicted ay block 810. As depicted at block 815, providing the fabric article may further involve the step of cutting a pattern from fabric stock to form the fabric article. Typically, the edge of the pattern corresponds with the profile. As depicted at block 820, the frame with elastic properties is provided. In embodiments, the frame is removed from an injection mold while in a heated state, as depicted at block 825. Upon removal, the frame may be directly transferred to an assembly fixture while still heated. Accordingly, this immediate transfer allows for deformation of the frame and installation of the fabric article as an inline, press-side assembly process, as opposed to a secondary operation implemented at a removed station.

As discussed above, upon removal from the injection mold, the frame placed aside and subsequently transferred to the assembly fixture. Accordingly, the frame may be mounted to the assembly fixture when partially cooled, fully cooled, or reheated. In this embodiment, placing the frame in the assembly fixture and attaching the fabric article to the frame is implemented as a secondary operation (i.e., not within an inline assembly procedure).

As depicted at block 830, a pre-forming operation to deform the frame is implemented. In embodiments, the performing operation includes placing the frame into the assembly fixture that includes one or more compression mechanisms (see block 835), and activating the compression mechanisms to apply the directional force to at least one portion of the frame (see block 840). Upon deforming the frame, the pre-cut fabric article is loaded thereto, as depicted at block 845. Typically, the fabric article is loaded in a loose condition without stress applied thereto. In an exemplary embodiment, loading the fabric article involves at least the steps of forming a groove along the perimeter of the frame (see block 850), and loading an edge of the fabric article within the groove such that the fabric article substantially spans the perimeter of the frame (see block 855). Upon installing the fabric article to the deformed frame, the compression mechanisms of the assembly fixture may be released, thereby relaxing the directional force applied to the frame. This is depicted at block 860. Incident to releasing the compression mechanisms, the frame reverts to its non-deformed configuration, thus, applying tension to the fabric article such that the fabric article assumes a taut condition that has a level of firmness.

Figure 9:
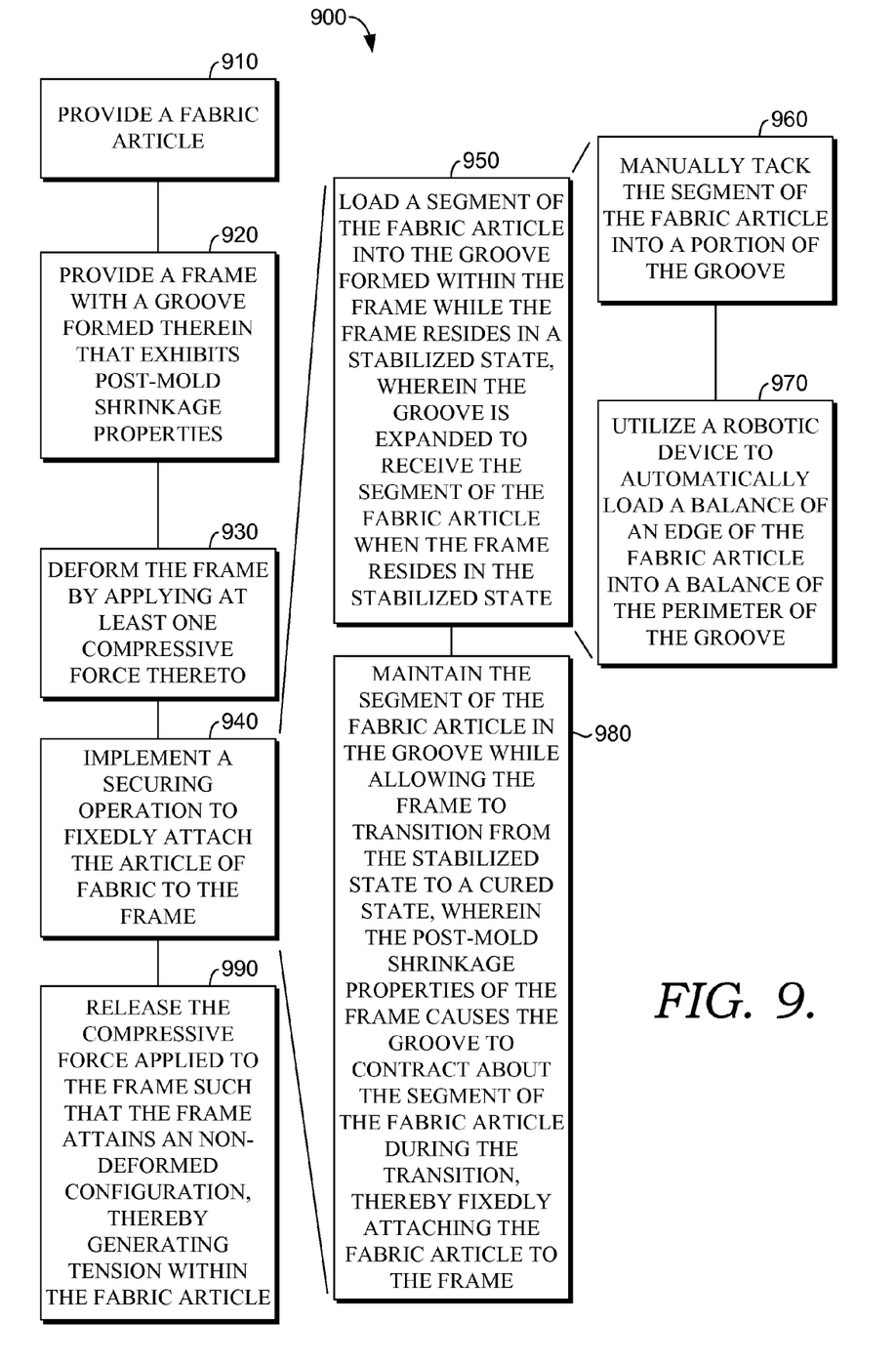
FIG. 9 illustrates an overall flow diagram of a method for securing the article of fabric that spans the frame by leveraging post-mold shrinkage properties of the frame, in accordance with an embodiment of the present invention.

Referring now to FIG. 9, an overall flow diagram is shown illustrating a method 900 for securing the article of fabric that spans the frame by leveraging post-mold shrinkage properties of the frame, in accordance with an embodiment of the present invention. Initially, a fabric article and a frame with a groove formed therein that exhibits post-mold shrinkage properties are provided. These steps are depicted at blocks 910 and 920. As depicted at block 930, the frame is deformed by applying at least one compressive force thereto. Upon deforming the frame, a securing operation to fixedly attach the article of fabric to the frame is implemented, as depicted at block 940. The securing operation may include at least the step of loading a segment of the fabric article into the groove formed within the frame while the frame resides in a stabilized state, as depicted at block 950. Typically, the groove is expanded to receive the segment of the fabric article when the frame resides in the stabilized state. Loading the segment of the fabric article into the groove may include manually tacking the segment of the fabric article into portion of the groove (see block 960), and utilizing a robotic device to automatically load a balance of an edge of the fabric article into a balance of the perimeter of the groove (see block 970).

In an exemplary embodiment, the securing operation may further include the step of maintaining the segment of the fabric article in the groove while allowing the frame to transition from the stabilized state to a cured state. This is depicted at block 980. Generally, the post-mold shrinkage properties of the frame causes the groove to contract about the segment of the fabric article during the transition. As such, this contraction fixedly attaches the fabric article to the frame. As depicted at block 990, the compressive force applied to the frame is released such that the frame attains a non-deformed configuration. Upon reverting to the non-deformed configuration, the frame generates tension within the fabric article.

It should be understood that the construction of the assembly (see reference numeral 700 of FIG. 7) lends itself to enable easy assembly to, and disassembly from, the seat and/or backrest. Specifically, the design of the frame may allow for use of quick-disconnect hardware, such as a knock-down fastener. Accordingly, rapid disconnection of components of the seating unit prior to shipping, or rapid connection in receipt, is facilitated.

The present invention has been described in relation to particular embodiments, which are intended in all respects to be illustrative rather than restrictive. Alternative embodiments will become apparent to those skilled in the art to which the present invention pertains without departing from its scope.

It will be seen from the foregoing that this invention is one well adapted to attain the ends and objects set forth above, and to attain other advantages, which are obvious and inherent in the device. It will be understood that certain features and subcombinations are of utility and may be employed without reference to other features and subcombinations. This is contemplated by and within the scope of the claims. It will be appreciated by persons skilled in the art that the present invention is not limited to what has been particularly shown and described hereinabove. Rather, all matter herein set forth or shown in the accompanying drawings is to be interpreted as illustrative and not limiting.

What is claimed is:

1. A method for generating tension in an article of fabric that spans a frame by pre-forming the frame prior to assembling the fabric article thereto, the method comprising:

placing the frame into an assembly fixture including one or more compression mechanisms;

activating the one or more compression mechanisms to apply a force to a perimeter of the frame, wherein the force that is applied deforms the frame from an initial shape by compressing a portion of the perimeter inward:

loading fabric article onto the frame in a loose condition without stress applied thereto while the frame is deformed;

securing the fabric that is in the loose condition within a groove of the frame along the perimeter, such that the fabric article substantially spans the perimeter of the frame;

releasing the one or more compression mechanisms, wherein releasing allows the frame to substantially return to the initial shape; and upon the frame substantially returning to the initial shape, the frame consequently generating tension in the fabric article such that the fabric article assumes a taut condition that has a level of firmness.

2. The method of claim 1, further comprising:
removing the frame from an injection mold while in a heated state; and
transferring the frame from the injection mold directly to the assembly fixture.

3. The method of claim 2, further comprising utilizing a robotic device to implement the process of transferring the frame to the assembly fixture.

4. The method of claim 1, wherein loading the fabric article to the deformed frame comprises:
providing the groove along a perimeter of the frame;
securing an edge of the fabric article within the groove such that the fabric article substantially spans the perimeter of the frame.

5. The method of claim 4, further comprising:
capturing a profile of the perimeter of the frame when deformed by the force applied by the one or more compression mechanisms; and
prior to initiating the process of loading the fabric article to the deformed frame, cutting a pattern from fabric stock to form the fabric article, wherein the edge of the pattern corresponds with the profile.

6. The method of claim 5, wherein cutting a pattern from fabric stock to form the fabric article comprises utilizing a laser-cutting device to automatically trim the fabric article from the fabric stock.

7. The method of claim 5, further comprising:
identifying that the frame has transitioned from the heated state to a stabilized stated, wherein the frame attains the stabilized state upon taking structural memory such that, upon being deformed, the frame elastically returns to the pre-deformed shape; and
implementing the pre-forming operation upon the frame attaining the stabilized state.

8. The method of claim 5, wherein applying a force to at least one portion of the frame comprises:
based on a shape and a material composition of the frame, determining a distance of deflection for deforming the frame such that the frame elastically returns to the pre-deformed shape; and
applying sufficient pressure to the at least one portion of the frame to achieve the distance of deflection.

9. The method of claim 5, wherein the pre-forming operation further comprising:
targeting a region of the fabric article to express a higher level of tension than another region of the fabric article; and
positioning the one or more compression mechanisms on the assembly fixture to engage the at least one portion of the frame that is proximate to the target region of the fabric article.

10. The method of claim 9, wherein activating the one or more compression mechanisms to apply a force further comprises automatically pneumatically or hydraulically invoking the one or more compression mechanisms to deform the frame upon the expiration of a predefined period of time, wherein the predefined period of time is based on a time for transitioning from the heated state to the stabilized stated.

11. The method of claim 9, wherein implementing a pre-forming operation to deform the frame further comprises at least one of warping, twisting, bending, laterally collapsing, or longitudinally collapsing the frame.

12. The method of claim 1, wherein the assembly fixture includes one or more capture elements for fixedly retaining at least one portion of the frame during the pre-forming operation.

13. The method of claim 1, wherein the assembly fixture includes a first compression mechanism of the one or more compression mechanisms that is positioned substantially opposed to a second compression mechanism of the one or more compression mechanisms.

14. A method for generating tension in an article of fabric that spans a frame by pre-forming the frame prior to assembling the fabric article thereto, the method comprising:
providing the fabric article;
providing the frame with elastic properties, wherein the frame includes a perimeter comprising at least one of lateral or longitudinal members;
removing the frame from an injection mold while in a heated state;
transferring the frame from the injection mold to an assembly fixture while in the heated state;
implementing a pre-forming operation to deform the frame, wherein the pre-forming operation comprises:
(a) placing the frame into the assembly fixture that includes one or more compression mechanisms; and
(b) activating the one or more compression mechanisms to apply a force to at least one portion of the frame, wherein the applied force causes the frame to deform from an initial shape;
assembling the fabric article to the deformed frame by a process comprising:
(a) loading the fabric article in a loose condition without stress applied thereto; and
(b) securing the loose-condition fabric article to one or more sections along the perimeter of the frame such that the fabric article substantially spans the members of the frame;
releasing the one or more compression mechanisms, wherein releasing allows the frame to substantially return to the initial shape; and
upon the frame substantially returning to the initial shape, the frame consequently generating tension in the fabric article such that the fabric article assumes a taut condition that has a level of firmness.

15. A method for generating tension in an article of fabric that spans a frame by pre-forming the frame prior to assembling the fabric article thereto, the method comprising:
providing the fabric article;
providing the frame with elastic properties, wherein the frame includes a perimeter comprising at least one of lateral or longitudinal members;
providing a groove along the perimeter of the frame;
implementing a pre-forming operation to deform the frame, wherein the pre-forming operation comprises:
(a) placing the frame into an assembly fixture that includes one or more compression mechanisms; and
(b) activating the one or more compression mechanisms to apply a force to at least one portion of the frame, wherein the applied force causes the frame to deform from an initial shape;
assembling the fabric article to the deformed frame by a process comprising:
(a) loading the fabric article in a loose condition without stress applied thereto; and
(b) securing the loose-condition fabric article within the groove along the perimeter of the frame such that the fabric article substantially spans the perimeter of the frame;
releasing the one or more compression mechanisms, wherein releasing allows the frame to substantially return to the initial shape; and upon the frame substantially returning to the initial shape, the frame consequently generating tension in the fabric article such that the fabric article assumes a taut condition that has a level of firmness.

* * * * *